US00RE39764E

(19) United States
(12) Reissued Patent
Streets et al.

(10) Patent Number: US RE39,764 E
(45) Date of Reissued Patent: Aug. 14, 2007

(54) COMPOSITE ROOF STRUCTURES PREPARED USING ONE-PART MOISTURE CURING POLYURETHANE FOAMING ADHESIVE COMPOSITIONS CONTAINING A REVERSIBLY BLOCKED CATALYST

(75) Inventors: Roger L. Streets, deceased, late of Ashland, OH (US); by Linda C. Streets, legal representative, Ashland, OH (US); David J. Hatgas, Dublin, OH (US); Terri S. Townsend, Ashland, OH (US); Carrie D. Margot, Atlanta, OH (US)

(73) Assignee: Ashland, Inc., Dublin, OH (US)

(21) Appl. No.: 10/664,052

(22) Filed: Sep. 16, 2003

Related U.S. Patent Documents

Reissue of:
(64) Patent No.: 6,305,143
Issued: Oct. 23, 2001
Appl. No.: 09/344,462
Filed: Jun. 25, 1999

(51) Int. Cl.
*E06B 1/00* (2006.01)

(52) U.S. Cl. ..... 52/746.11
(58) Field of Classification Search ..... 52/309.5, 52/309.9, 408, 411, 746.11, 745.06; 156/71, 156/280; 428/317.1, 317.7, 319.1
See application file for complete search history.

(56) References Cited

U.S. PATENT DOCUMENTS

| | | | | | |
|---|---|---|---|---|---|
| 3,330,849 | A | | 7/1967 | Ulrich | 260/453 |
| 3,830,760 | A | | 8/1974 | Bengston | 260/2.5 |
| 4,489,176 | A | | 12/1984 | Kluth et al. | 521/144 |
| 4,511,626 | A | | 4/1985 | Schumacher | 428/425.6 |
| 4,824,595 | A | | 4/1989 | Richter et al. | 252/182.17 |
| 4,996,812 | A | | 3/1991 | Venable | 52/408 |
| 5,253,461 | A | | 10/1993 | Janoski et al. | 52/408 |
| 5,362,342 | A | | 11/1994 | Murray et al. | 156/71 |
| 5,368,665 | A | * | 11/1994 | Koyama et al. | 156/71 |
| 5,391,246 | A | * | 2/1995 | Stephens | 156/71 |
| 5,643,983 | A | | 7/1997 | Lee | 524/267 |
| 5,872,203 | A | | 2/1999 | Wen et al. | 528/66 |
| 5,895,536 | A | | 4/1999 | Starr et al. | 156/71 |
| 6,044,604 | A | * | 4/2000 | Clayton et al. | 52/309.9 |

FOREIGN PATENT DOCUMENTS

| | | |
|---|---|---|
| GB | 2242435 | * 10/1991 |
| WO | 82/01684 | * 5/1982 |
| WO | 00/37534 | * 6/2000 |

* cited by examiner

*Primary Examiner*—Jerry Redman
(74) *Attorney, Agent, or Firm*—Wood, Herron & Evans, L.L.P.

(57) ABSTRACT

The present invention relates to composite roof structures and their preparation. The composite roof structure is prepared by applying a one-part, moisture curable, foaming, polyurethane adhesive composition to the roof deck, placing the roofing material in contact with the adhesive composition, and allowing the adhesive mixture to foam, fill, and cure. If multiple layer of the roofing material are used to form the composite roof structure, then the above procedure may be used to adhere each of the roofing material layers.

13 Claims, No Drawings

COMPOSITE ROOF STRUCTURES PREPARED USING ONE-PART MOISTURE CURING POLYURETHANE FOAMING ADHESIVE COMPOSITIONS CONTAINING A REVERSIBLY BLOCKED CATALYST

Matter enclosed in heavy brackets [ ] appears in the original patent but forms no part of this reissue specification; matter printed in italics indicates the additions made by reissue.

CROSS REFERENCE TO RELATED APPLICATIONS (NOT APPLICABLE)

STATEMENT REGARDING FEDERALLY SPONSORED RESEARCH (NOT APPLICABLE)

BACKGROUND OF THE INVENTION

The invention relates to composite roof structures and their preparation. The composite roof structures are prepared by adhering roofing material to a roof deck using a one-part, moisture curable, polyurethane adhesive composition containing dissolved or dispersed therein, reversibly blocked catalysts that are activated by moisture. Once activated by moisture the polyurethane adhesive composition foams in place. The adhesive compositions are storage stable in the absence of moisture and useful as a gap filling adhesive for adhering the roofing material to irregular surfaces.

In the roofing art many different methods are used to secure roofing materials to the roof deck structure, especially flat roofs. Mechanical fasteners have been used to secure roofing materials such as insulation boards and waterproofing membrane to the roof deck. However, the use of fasteners is undesirable because the method necessitates puncturing the roofing material and the roof deck. Even where the fasteners are coated with special materials to prevent corrosion and leakage, separation due to movement caused by thermal expansion and contraction, or wind uplift occurs thus compromising the effectiveness of the seal around the fastener. Additionally, when an old roof is replaced the old roofing material and mechanical fasteners are simply removed and new materials are laid down and attached with new fasteners. The numerous holes created by removing old fasteners weakens the integrity of the roof deck and creates routes of entry for water. In an effort to overcome the shortcomings of mechanical fasteners, methods to adhere roofing materials to the roof deck without mechanical fasteners have been developed. These methods typically utilize an adhesive composition in combination with the roofing materials and the roof deck to form a composite structure. U.S. Pat. No. 4,489,176 discloses the use of a polyurethane composition as a construction adhesive for applying insulation and decorative films on a number of substrates including roof decks. The polyurethane composition consists of a foam stabilizer, a prepolymer, a diluent, and optional auxiliary agents. The diluents used include the typical halogenated hydrocarbons well known as blowing agents in foam compositions. U.S. Pat. No. 4,996,812 describes a composite roof construction comprising a fleece-back flexible membrane, an adhesive, and the roof deck. The adhesive is preferably a foamed, cellular adhesive. The benefit of the invention resides in the use of the fleece-backed liner. The adhesive embedded in the fleece-back purportedly enhances the bond between the adhesive and the membrane and allows dissipation of the foaming gasses. U.S. Pat. No. 5,253,461 discloses a fastener free roof composite comprising a roof deck, insulation and an adhesive composition comprised of asphalt dispersed in an isocyanate prepolymer, with a compatibilizer. The adhesive may contain a non-reactive diluent. U.S. Pat. No. 5,872,203 discloses a two-part, moisture cure, polyurethane adhesive composition. The first part contains isocyanate or a prepolymer. The second part contains a polyether polyol, a reinforcing diol, a hydroxyl terminated polybutadiene and a tackifier. U.S. Pat. No. 5,895,536 discloses a method of adhering roofing tiles using a one-component adhesive. The method consists of applying a small amount of adhesive foam to each roofing tile rather than applying the adhesive as a bead or coating. No particular foam formulation is disclosed.

In many instances polyurethane has become the adhesive of choice in roofing applications. This is due in part to its well defined chemistry. Formulations of polyisocyanate terminated urethane prepolymers have successfully been used for both one and two-part polyurethane foam compositions. These foams may be used in aerosol form as described in U.S. Pat. No. 3,830,760 or when formulated with various quantities of foam stabilizers and low boiling diluents as described in U.S. Pat. No. 4,489,176 above. The disadvantages of two-part urethane foams as roofing adhesives are obvious. The two-part formulations require mixing and metering apparatus and cannot be combined until immediately prior to application. Disadvantages of conventional one-part, moisture curing, foamable, urethane adhesive formulations include their limited shelf life. One shelf life limiting factor is the dimerization of terminal isocyanate groups of the polyurethane prepolymer which is accelerated by catalysts contained in the formulation. This dimerization of the terminal isocyanate groups, even in tightly sealed containers free of oxygen and/or moisture, leads to discoloration of the prepolymer accompanied by increased viscosity. Further disadvantages associated with using conventional urethane foams whether one-part or two-part include environmental concerns over blowing agents, disposal of pressurized containers, and lack of fill capabilities of prefoamed urethanes on irregular substrates.

The present invention provides an improved method of forming composite roof structures that addresses the problems found in the art. One-part, moisture curable, polyurethane adhesive compositions stabilized with a reversibly blocked catalyst, are used to adhere roofing materials to a roof deck. The stabilized polyurethane adhesive compositions are applied to the roof deck structure from unpressurized containers. Once exposed the compositions foam and cure rapidly, filing irregularities and providing bonds between roofing materials such as insulation board, fleece-backed elastomeric membranes, other polymeric roofing membranes, and the roof deck. The present invention eliminates the need for mechanical fasteners, bulky mixing and metering equipment, and pressurized product containers.

BRIEF SUMMARY OF THE INVENTION

The invention relates to composite roof structures and their preparation. The roof structures comprise at least one layer of a roofing material, the roof deck, and an adhesive material. The roofing material may be insulating boards, elastomeric membrane such as EPDM with a fleece-back, other polymeric membranes and the like. The roof deck may be any material that a roof deck can be made of such as metal, wood, cement, etc. or an old roof consisting of the roof deck and a covering such as built-up-roofing consisting of asphalt, fiber sheathing, such as felt and a granulated cap. The adhesive is a one-part, moisture curing, foaming polyurethane adhesive composition containing a reversibly blocked catalyst. The adhesive composition is composed of an isocyanate terminated polyurethane prepolymer prepared from at least one organic polyisocyanate and at least one composition containing isocyanate reactive moieties. The adhesive composition also contains a reversibly blocked catalyst consisting essentially of the addition product of a sulfonyl isocyanate, and a tertiary amine and/or tin carboxylate dissolved or dispersed in the isocyanate terminated prepolymer. The adhesive optionally contains additives known in the art such as fillers, tackifiers, plasticizers, flame retardants, etc. The adhesive compositions of the present invention are free of foam stabilizers and low boiling diluents having boiling points of from 20° C. to 80° C.

The composite roof structure is prepared by applying the adhesive to the roof deck and setting roofing material in place on the roof deck. If multiple layers of roofing materials are used or in the case of edge overlap the polyurethane adhesive compositions can be used to adhere the multiple layers or edge overlap. In especially hostile environments such as extreme cold or very low humidity the roof deck may be sprayed with an aqueous solution prior to applying the adhesive composition. When exposed to moisture the adhesive composition foams and cures rapidly providing a gap filling foam and excellent bonds between layers of roofing material and the roof material and roof deck.

BRIEF DESCRIPTION OF THE SEVERAL VIEWS OF THE DRAWING [NOT APPLICABLE]

DETAILED DESCRIPTION OF THE INVENTION

The invention relates to composite roof structures and their preparation. The roof structures comprise at least one layer of roofing material, the roof deck and an adhesive material.

The roofing material includes but is not limited to thermoset and thermoplastic elastomeric membranes such as EPDM with or without a fleece-back, rigid foam panels such as isocyanurate insulating panels, and other polymeric membranes such as thermoplastic polyolefin, polyvinyl chloride, and chlorosulfonated polyethylene.

The roof deck may be any material that is known to be used as decking material. Non-limiting examples include decking made from plywood, chipboard, concrete, and ferrous and non-ferrous metals. For purposes of the present invention a roof deck also includes composite roof structures of a deck and existing roof covering, such as an asphalt built-up roof The adhesive material is a one-part, moisture curable, polyurethane composition containing dissolved or dispersed therein a reversibly blocked catalyst that is activated by moisture. The adhesive composition comprises an isocyanate terminated prepolymer prepared from at least one organic polyisocyanate, at least one composition having at least two isocyanate reactive moieties; and a reversibly blocked catalyst consisting essentially of the addition product of a sulfonyl isocyanate, a tertiary amine and/or a tin(I) or tin(IV) carboxylate composition commonly used in the preparation of polyurethane foams. Although the adhesive composition optionally contains additives such as fillers, tackifiers, plasticizers, and flame retardants; it is free of foam stabilizers and low boiling diluents having boiling points from 20° C. to 80° C.

The isocyanate terminated polyurethane prepolymers of the present invention contain at least one organic polyisocyanate having at least two organically bound isocyanate groups per molecule. The molecular weight of the polyisocyanate calculable from the functionality and content of the functional groups is from about 300 to about 10,000; preferably from about 300 to about 5,000. Examples of low molecular weight polyisocyanates useful in the invention include but are not limited to 2,4- and 2,6-tolylene diisocyanate; the various combinations of isomers for diphenylmethane diisocyanate as well as the pure isomer forms; naphthathylene-1,5 diisocyanate; polyphenyl polymethylene polyisocyanate; triphenylmethane-4,4',4"-triisocyanate; 1-isocyanato-3,3,5-trimethyl-5-isocyanatomethyl cyclohexane; 2,4- and 2,6hexahydrotolylene diisocyanate and mixtures of these isomers; hexahydro-1,3-and/or 1,4-phenylene diisocyanate; hexamethylene diisocyanate; 1,12-dodecane diisocyanate; cyclobutane-1,3diisocyanate; cyclohexane-1,3 and -1,4diisocyanate and mixtures thereof The low molecular weight polyisocyanates may be reacted to form relatively high molecular weight polyisocyanates containing carbodiimide, allophanate, biuret, and uretdione groups.

The isocyanate terminated polyurethane prepolymers according to the invention preferably contain at least one nitrogen free polyhydroxyl compound. The polyhydroxyl compounds may be simple polyhydric alcohols such as ethylene glycol, 1,2-butane diol, or trimethylol propane; or polyether polyols, polyester polyols, and/or hydroxyl terminated polymeric/elastomerics known to those skilled in the art such as hydroxyl terminated polybutadiene. The polymeric polyhydroxyl compounds have molecular weights of from about 300 to about 12,000 and contain from 2 to 8 hydroxyl groups. The polyether polyols are prepared using up to 50 weight % ethylene oxide, preferably from about 10 wt % to about 50 wt % ethylene oxide. Other less preferred compositions containing isocyanate reactive moieties such as —NH and —SH may be present. The isocyanate terminated polyurethane prepolymer preferably has a free isocyanate content of from about 3 wt % to about 25 wt %, more preferably from about 7 wt % to about 15 wt %. The blocked catalyst formulations useful in the polyurethane adhesive compositions of the present invention consist essentially of the addition product of a sulfonyl isocyanate with a tertiary amine and/or a tin(II) or tin(IV) carboxylate compound. Sulfonyl isocyanates useful in the blocked catalysts are compounds containing at least one unit of the formula $—SO_2—NCO$ The preferred sulfonyl isocyanates are those containing aromatically bound isocyanatosulfonyl radicals as describe in U.S. Pat. No. 3,330,849, the contents of which are incorporated herein by reference. It is also possible to use aliphatic, cycloaliphatic, and aromatic mono or polysulfonyl isocyanates in making blocked catalysts useful in the present invention. Methods of preparing and examples of the blocked catalyst compositions are contained in U.S. Pat. No. 4,824,595, the contents of which are incorporated herein by reference.

Tertiary amines and tin compounds are those known to be useful as catalyst in the formation of polyurethane foams. These catalysts are used to balance the urethane reaction (gelling reaction) and the blowing reaction (generation of $CO_2$). Listings of acceptable tertiary amines and tin compounds are setforth in U.S. Pat. No. 4,824,595, previously incorporated by reference. Tertiary amines and the tin compounds may be used individually or as a mixture in the reversibly blocked catalyst composition. A mixture of a tertiary amine and a tin salt of a carboxylic acid is preferred. Preferred tertiary amines are those amines having molecular weights of from about 50 to about 8000, more preferably from about 50 to about 1,000. Examples of preferred tin catalyst include tin acetate, tin octoate, tin laurate, dibutyl tin dilaurate, and dibutyltin dimaleate. The preferred tertiary amines and tin salts of carboxylic acids do not contain additional hydroxyl or amine functionality.

Although not preferred additives known in the art such as fillers, tackifiers, plasticizers, flame retardants and the like may be present. Fillers that may be used in include natural clays, talc, fumed and precipitated silica, and the like. Tackifiers include polyterpene, rosin esters, polybutenes, etc. Plasticizers include phthalates, adipates, sebacates, etc. Flame retardants known in the art such as melamine may also be included.

The one-part, moisture curing, foaming, polyurethane adhesive compositions are stored in suitable containers, in the absence of moisture, under an inert atmosphere such as argon. The one-part, moisture curing, foaming, polyurethane adhesive compositions may be applied by any convenient means. The adhesive compositions may be poured, brushed, sqeegied or rolled on a surface to be adhered. Preferably, bead(s) of the polyurethane adhesive composition are applied along the surface of a roof deck corresponding to the position of the overlaying roofing material; or if multiple layers of roofing materials are used adhesive is applied to each layer in the multiple layer composite roof structure. The adhesive can be applied directly to the old surface of existing composite roof structures. In this case the adhesive is applied directly to the existing surface. Pressure sufficient to seat the roofing material in the polyurethane adhesive is applied and the composition is allowed to foam, fill and cure.

Under environmentally stringent conditions, such as cool temperatures or low humidity conditions the surface on which the adhesive composition is to be applied may be misted. The surface may be misted with water or an aqueous solution containing components such as tertiary amines, organic acids, etc. designed to accelerate the cure rate of the adhesive composition.

Having thus described the invention the following examples are offered by way of illustration and should not be construed as limiting.

In the examples all test are performed at room temperature unless otherwise indicated. RH is relative humidity and RT is room temperature.

Pep 550: is a mixed initiator 500 molecular weight propylene oxide based polyol with an average functionality of about 4 and hydroxyl number range of 435.0–465.0, with a viscosity of 2400 cps at 68° F., commercially available from BASF Corp.

PLURACOL 593: is a 8lycerine initiated 3650 molecular weight polyol containing a high proportion of ethylene oxide in the propylene oxide chain with a hydroxyl number range of 45.0–47.0, a viscosity of 1340 cps at 77F; commercially available from BASF Corp.

ACCLAIM 8200: is a DMC (double metal catalyst), Zinc Hexacyanocobaltate catalyzed 8000 molecular weight, low monol (low unsaturation, 0.015 to 0.02meq/g) diol with a hydroxyl number range of 13.0–15.0; commercially available from ARCO Chemical Co.

Olin Poly G 20-56: is a 2000 molecular weight propylene oxide based polyol with an average functionality of about 2 and a hydroxyl number range of 27.0–29.0, a viscosity of 848 cps at 25° C., commercially available from Olin Corp.

Lupranate MM 103: is a light yellow liquid carbodiimide modified 4,4'-diphenylmethane diisocyanate with an NCO content by weight of 29.5% a viscosity of 40 cps at 25° C.; commercially available from BASF Corp.

Polyisocyanate No. 255: is a dark brown liquid polymethylene polyphenylisocyanate with an NCO content by weight of 31.5%; a viscosity of 75 cps at 25° C.; commercially available from BASF Corp.

RUBINATE 9310: is light yellow liquid carbodiimide modified 4,4'-diphenylmethane diisocyanate with an NCO content by weight of 28.8 to 29.6%; a viscosity of 60 cps at 25° C.; commercially available from ICI Corp.

MONDUR MRS: is a dark brown liquid polymethylene polyphenylisocyanate with an NCO content by weight of 30.4 to 31.7%, a viscosity of 150 to 250 cps at 25° C.; commercially available from Bayer.

JEFFCAT ZF-20: is a clear liquid of about 98.6% by weight purity of bis(2-dimethylaminoethyl) ether, with a viscosity of <4 cps at 20° C.; commercially available from Huntsman Corp.

JEFFCAT T-12: is a clear pale yellow liquid with a total tin content of 18.5±0.5% by weight of dibutyltin dilaurate, a viscosity of <80 cps at 20° C.; commercially available from Huntsman Corp.

JEFFCAT PMDETA: is a clear liquid at a 98.0% by weight purity of pentamethyldiethylene triamine with a total amine content of 17.1 to 17.4 meq/g, a viscosity of 1.35 cSt at 100° F.; commercially available from Huntsman Corp.

NIAX C-5: is a colorless to straw liquid of a tertiary amine composition characterized as a strong blowing catalyst while maintaining a good gel profile with a specific gravity of 0.83, a boiling point of 200° C. at 760mm Hg; commercially available from OSI Specialties.

NIAX A-31: is a colorless to straw liquid of a tertiary amine composition characterized by a low odor, a smooth consistent rise profile with a specific gravity of 0.985 at 20° C., a viscosity of 23 cSt at 25° C.; commercially available from OSI Specialties.

INSTA-STIK is a registered trademark of Insta-Foam Products, a division of FLEXIBLE PRODUCTS CO.

EXAMPLE 1

A formulation consisting of a polyether polyol (BASF Pluracol 593), an isocyanate (BASF No. MM103), and a polymeric MDI (BASF No. 255)/blocked catalyst was prepared by first preparing an isocyanate terminated prepolymer. The polyol was stripped of moisture to a level of <200 ppm at 250° F. under vacuum. When the desired moisture level was attained the polyol was cooled to 180° F. and the MDI was added and reacted for one hour at 180° F. The resulting prepolymer was cooled to 130° F. and the polymeric MDI/blocked catalysts added.

The polymeric MDI/blocked catalysts was prepared by adding polymeric MDI to the reactor, pulling a vacuum (minimum 28 mmHg) and cooling to 15° C. (59° F.), the reactor was blanketed under an inert atmosphere, and a tertiary amine (Huntsman Jeffcat ZF-20) was added. Immediately after the amine addition was completed, paratoluene sulfonylisocyanate, (PTSI) was added at a rate which maintained the temperature rise to a maximum of 21° C. (70° F.), then the tin dilaurate (Huntsman Jeffcat T-12), was added with additional PTSI while maintaining a maximum temperature of21° C.(71° F.). Once the blocking reaction was complete, the polymeric MDI/blocked catalysts was added to the isocyanate terminated prepolymer. The formulation was packaged under an inert blanket (argon).

| | %, by weight |
|---|---|
| Pluracol 593 | 55.18 |
| Isocyanate No. MM103 | 25.99 |
| Polyisocyanate No. 255 | 16.55 |
| Jeffcat ZF-20 | 0.41 |
| PTSI | 1.53 |
| Jeffcat T-12 | 0.14 |
| PTSI | 0.20 |
| | 100.00 |
| Free NCO, % by weight: | 10.0-11.0 |
| Viscosity, cps - Brookfield RVT #5 at 20: | 15,000-25,000 |
| Foam initiation, minutes: | 5.0-10.0 |
| Foam Rise, inch max (in 20 minutes) | ¾-1.0* |
| Lap Shear, psi - CDX Plywood: | 300-500 SF** |

*Maximum Foam Rise was measured when the temperature is above 40° F. and the % relative humidity was above 40%
**SF: Substrate Failure

EXAMPLE 2

A prepolymer was prepared according to the procedure of Example 1 using a blend of polyols, a low molecular weight diol (Acclaim 8200) and a tetrol (BASF PEP550) and an isocyanate (Rubinate 9310). Various polymeric MDI (Mondur MRS)/blocked catalysts were prepared as in example 1 using:

a) Huntsman Jeffcat ZF-20 b) Huntsman Jeffcat PMDETA c) OSI Niax C-5/Jeffcat PMDETA d) OSI Niax A-3/Jeffcat PMDETA the PTSI was added at mol ratios of >1.0/1.1 but <1.0/1.7.

Lapshear specimens were constructed using CDX plywood (1"×4"×⅜") coupons; coated with the polyurethane adhesives of example 2; mated using an overlap of 1 inch; allowed to cure for 24 hours at ambient conditions, (75° F./50% RH); placed in their respective aging environments; room temperature (75° F./50% RH), 158° F. circulating air oven, and 158° F. circulating air oven immerse in water. The lapshears were aged as noted and tested for tensile strength (psi) using a cross head speed of 0.5 inches/minute.

| | Tested | ZF-20 | PMDETA | C-5/ PMDETA | A-31/ PMDETA |
|---|---|---|---|---|---|
| Aged | | | | | |
| 1 day @ RT | RT | 438.3 | 422.8 | 436.7 | 462.3 |
| 3 day @ RT | RT | 441.0 | 509.6 | 459.9 | 643.0 |
| 7 day @ RT | RT | 617.5 | 627.8 | 687.1 | 648.1 |
| 28 day @ RT | RT | 564.7 | 732.9 | 807.1 | 900.0 |
| 1 day @ 158° F. | 158° F. | 397.5 | 378.4 | 390.2 | 423.6 |
| 3 day @ 158° F. | 158° F. | 407.3 | 452.8 | 511.0 | 454.5 |
| 7 day @ 158° F. | 158° F. | 601.6 | 575.9 | 642.9 | 693.6 |
| 28 day @ 158° F. | 158° F. | 653.8 | 712.9 | 724.8 | 862.5 |
| Water Immersion | | | | | |
| 1 day @ 158° F. | RT | 151.5 | 101.5 | 280.0 | 246.5 |
| 3 day @ 158° F. | RT | 97.4 | 10.3 | 74.4 | 13.2 |
| 7 day @ 158° F. | RT | 67.1 | 11.0 | 73.9 | 71.9 |
| 28 day @ 158° F. | RT | 38.4 | 61.5 | 63.8 | 64.2 |

Note:
All the lapshear values tested at RT and 158° F. resulted in substrate failure.

A commercially available polyurethane single component adhesive supplied in an aerosol tank (Insta-Stik) was also tested under RT conditions in a similar manner.

Lapshear strengths of 100 to 150 psi were obtained and no additional testing conducted.

EXAMPLE 3

A prepolymer was prepared according to the procedure of Example 1 using a polyol, a 2000 molecular weight diol (Olin Poly G 20-56) and an isocyanate (Rubinate 9310). A polymeric MDI (Mondur MRS)/blocked catalyst was prepared as in Example 1 using:

Jeffcat T-12 the PTSI added at mol ratios of >1.0/1.1 but <1.0/1.7.

Lapshear specimens were constructed using CDX plywood (1"×4"×⅜") coupons. The CDX plywood coupons were placed in the respective aging environments, 40° F., 75° F., 120° F., and 158° F. and allowed to equilbrate; coated with the polyurethane adhesives of example 3; mated using an overlap of 1 inch; and the lapshears aged in their respective environments. At 4, 8, 16, 24, and 48 hours bonds were removed from their environments; aged one hour at 75° F., and tested in an Instron at a crosshead speed of 0.5 inches per minute.

| TENSILE STRENGTH, PSI* | | | | | |
|---|---|---|---|---|---|
| Environment, ° F. | 4 | 8 | 16 | 24 | 48 Hrs |
| 40 | 0 | 17 | 368 | 399 | 469 |
| 75 | 272 | 243 | 346 | 402 | 270 |
| 120 | 103 | 141 | 245 | 182 | 136 |
| 158 | 498 | 555 | 550 | 537 | 410 |

*Bond strengths in excess of 400 psi resulted in CDX plywood failure

EXAMPLE 4

Using the formulation of Example 1;

One square foot sections of roofing material consisting of 2 inch thick isocyanurate foam insulation with an asphaltic facer were cut from a 4'×8' commercial board.

A misting solution consisting of a 10% solution of Formic acid in water was made.

The adhesive, misting solution, and isocyanurate insulation squares were taken outside to a concrete pad that was several years old. The temperature was 45° F. and the relative humidity 71%.

A one square foot area of the concrete pad was misted with the formic acid solution. ¼ inch beads of adhesive were applied to the concrete, over the misted area and over the unmisted concrete, in a pattern such that the perimeter and two strips in the middle of each insulation square were adhered.

The insulation squares were seated on the adhesive beads using hand pressure.

The adhesive over the misted area began to foam immediately while the adhesive over the unmisted area initiated foaming in 5 minutes. In one hour the insulation square placed over the misted area was permanently bonded, while the square over the unmisted area could be moved by applying moderately strong hand pressure. In three hours the square over the unmisted area was also permanently bonded.

EXAMPLE 5

Using the formulation of Examples 1 and 3:

A field trial was conducted on two 1500 sq. foot identical roof sections. An existing roof of BUR (built-up asphalt roof of a 2 ply construction with a granulated cap sheet) was removed revealing a slightly damp plywood deck. The air temperature at the time of application was 61° C. with a relative humidity of 61%. The plywood deck temperature was measured at 120° F.

The polyurethane formulation of example 1 was applied in beads at a coverage rate of 3 squares per gallon. The beads initiated foaming in 3 minutes, at which time, 1 inch fibreboard in 4'×4' squares were seated into the foaming beads on the plywood deck.

Within 30 minutes an exposed, foamed bead would lose wettability to the touch, but continued to wet out the fibreboard as it was kicked into place. After 1 hour the fibreboard panels were securely bonded to the roof deck.

On the second roof deck (of the same construction as the first roof) an asphaltic cap sheet was cracking and showed signs of significant wear. The air temperature had risen to 75° C. with a relative humidity of 65%. The cap sheet temperature was 140° F. Six foot wide sheets of fleeced back EPDM were positioned on the roof The polyurethane formulation of Example 3 was applied in beads at a coverage rate of 2½ squares per gallon for two lengths of the roof On the third length the polyurethane formulation of example 3 was applied by squeegie at a coverage rate of 2 squares per gallon.

The fleece backed EPDM was rolled into the adhesive coated cap sheet and broomed into place. The next morning the fleece backed EPDM was securely bonded to the cap sheet. Attempts to peel the EPDM from the cap sheet resulted in cap sheet failure.

We claim:

1. A method of adhering roofing material to a roof deck, comprising;

A. applying a one-part, moisture curable, foaming, polyurethane adhesive composition, consisting essentially of;

i. an isocyanate terminated prepolymer prepared from at least one organic polyisocyanate and at least one composition containing at least two isocyanate reactive moieties, and ii. a reversibly blocked catalyst, consisting essentially of; the addition product of a sulfonyl isocyanate and a tertiary amine and/or a tin (II) or tin (IV) carboxylate composition; to a roof deck;

B. positioning the roofing material on the deck with sufficient pressure to seat the roofing material in the polyurethane adhesive composition; and C. allowing the polyurethane composition to foam, fill and cure.

2. The method of adhering roofing material as claimed in claim 1, where prior to applying the polyurethane adhesive composition to the roof deck, the roof deck is misted with water.

3. The method of adhering roofing material as claimed in claim 1, where prior to applying the polyurethane adhesive composition to the roof deck, the roof deck is misted with an acidic, aqueous solution.

4. The method of adhering roofing material as claimed in claim 1, where the organic polyisocyanate is diphenylmethane diisocyanate.

5. The method of adhering roofing material as claimed in claim 1, where the composition containing at least two isocyanate reactive moieties is a polyether polyol free of nitrogen.

6. The method of adhering roofing material as claimed in claim 1, where the reversibly blocked catalyst is the reaction product of a sulfonyl isocyanate, a tertiary amine, and a tin(II) or tin(IV) carboxylate composition.

*7. A method of adhering roofing material to a roof deck comprising:*

*applying to said roof deck a one part moisture curable foaming polyurethane adhesive composition consisting essentially of:*

*an isocyanic terminated pre-polymer prepared from at least one organic polyisocyanate and at least one composition containing at least two isocyanate reactive moieties; and*

*a reversibly blocked catalyst consisting essentially of the addition product of a sulfonyl isocyanate and at least one of the group consisting of a tertiary amine, a tin (II) structural unit and a tin (IV) structural unit;*

*positioning roofing material on the deck with sufficient pressure to seat the roofing material in the polyurethane adhesive composition; and*

*allowing the polyurethane composition to foam, fill and cure.*

*8. The method of adhering roofing materials claimed in claim 7 wherein prior to applying the polyurethane adhesive composition to the roof deck, the roof deck is misted with water.*

*9. The method of adhering the roofing materials claimed in claim 7 wherein prior to applying the polyurethane adhesive composition to the roof deck the roof deck is misted with an acidic aqueous solution.*

*10. The method of adhering the roofing material as claimed in claim 7 wherein the organic polyisocyanate is diphenyl-methane diisocyanate.*

*11. The method of adhering roofing materials claimed in claim 7 wherein a composition containing at least two isocyanate moieties is a polyetherpolyol free of nitrogen.*

*12. The method claimed in claim 7 wherein said reversibly blocked catalyst consists essentially of the addition product of a sulfonyl isocyanate and at least two of the group consisting of a tertiary amine, a tin (II) structural unit and a tin (IV) structural unit.*

*13. The method claimed in claim 7 wherein said reversibly blocked catalyst consists essentially of the addition product of a sulfonyl isocyanate and a tertiary amine and a tin (II) structural unit and a tin (IV) structural unit.*

* * * * *